April 29, 1941.   R. H. KINGDON ET AL   2,240,187
ENCLOSURE FOR ELECTRIC DEVICES
Filed Nov. 24, 1939   3 Sheets-Sheet 3
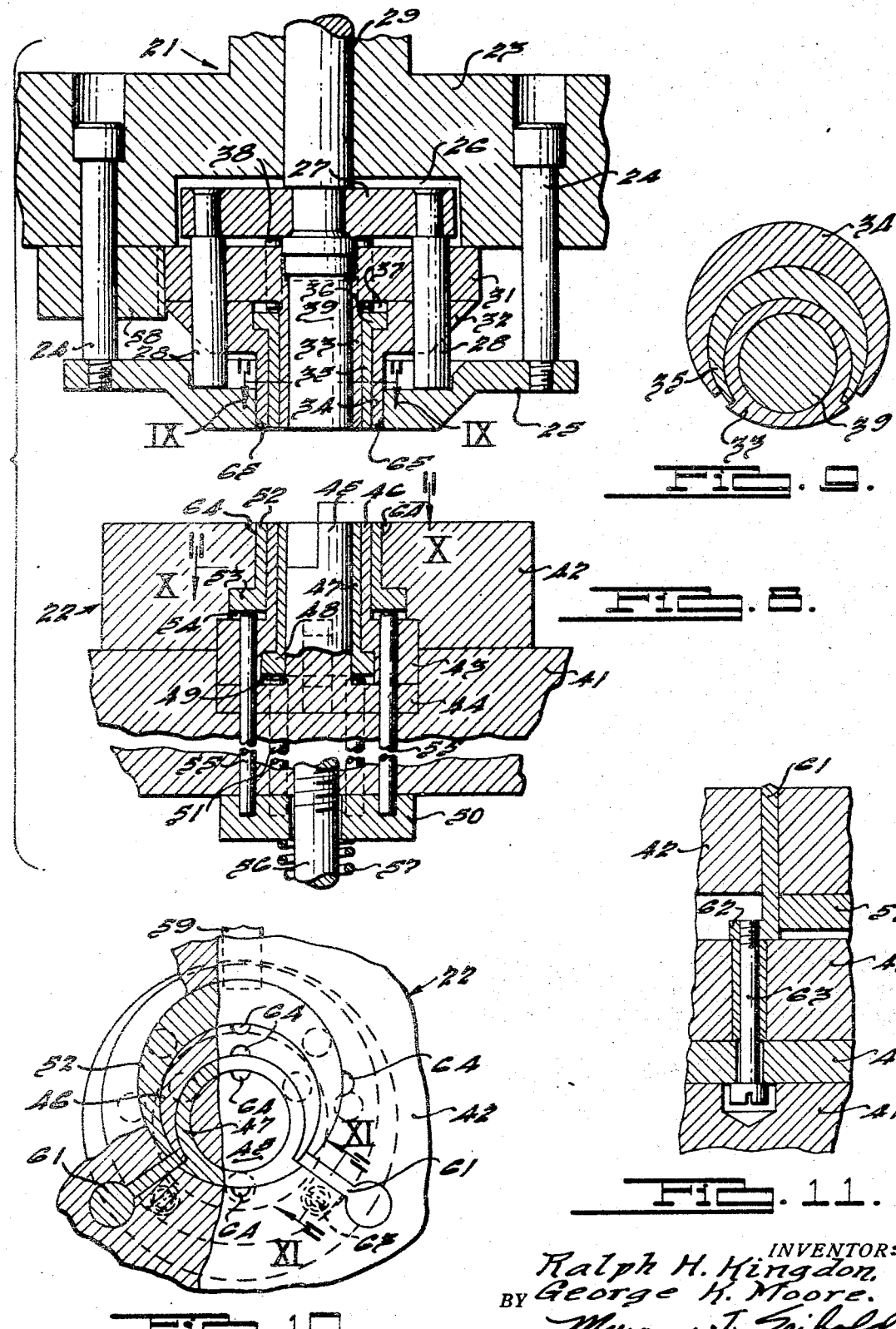
INVENTORS.
Ralph H. Kingdon,
BY George K. Moore.
Myron J. Seibold
ATTORNEY Patented Apr. 29, 1941

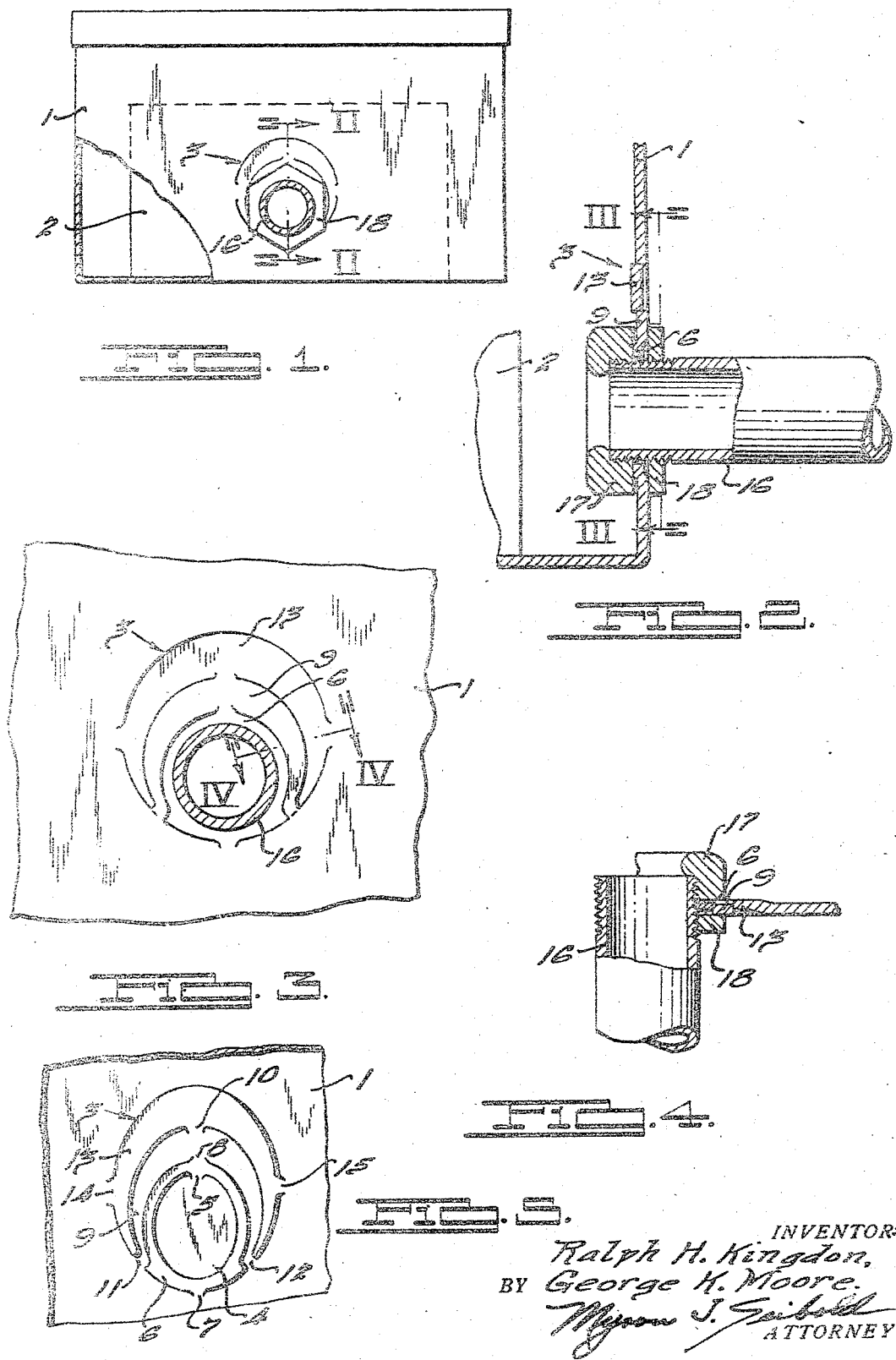

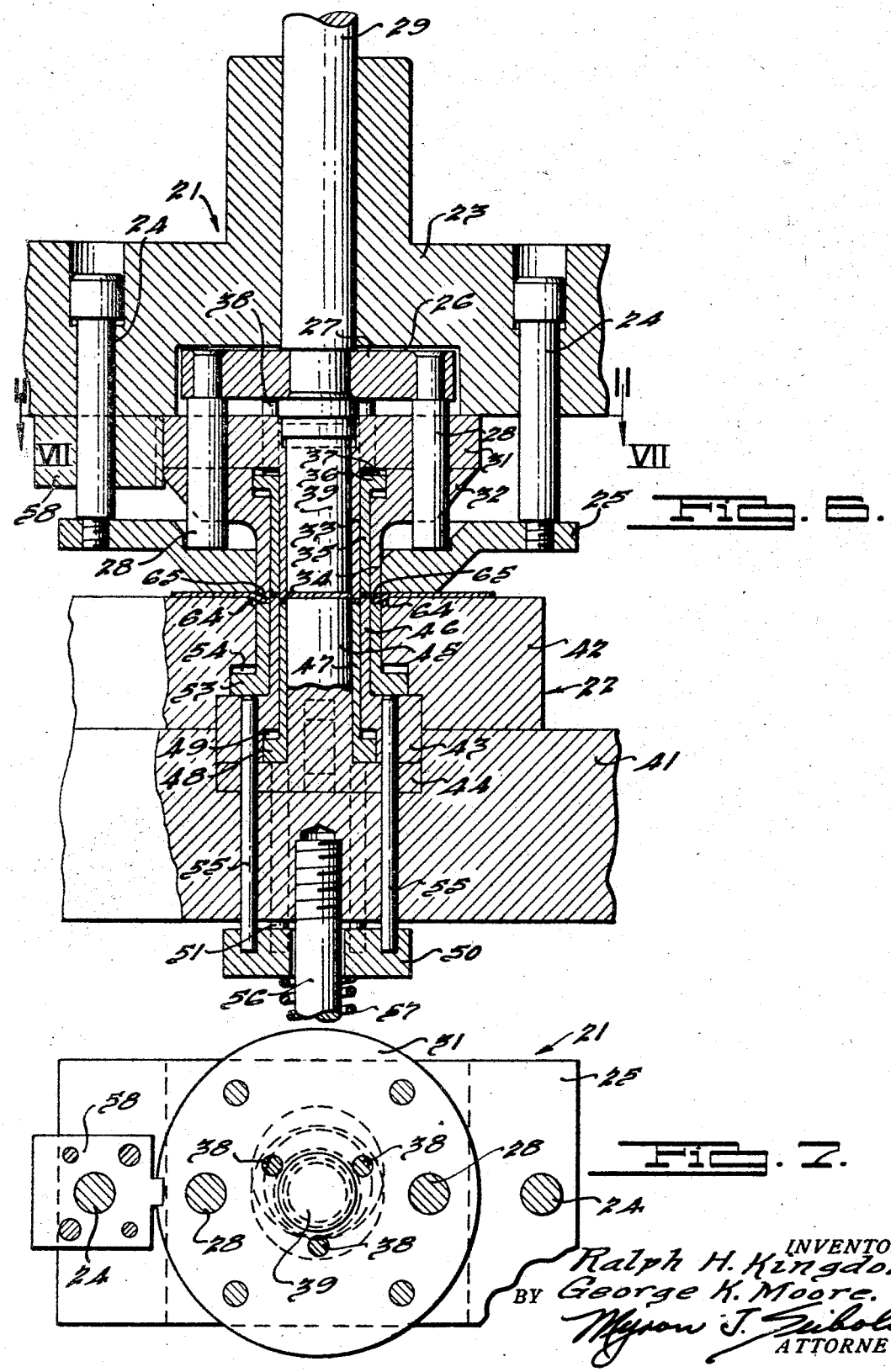

2,240,187

UNITED STATES PATENT OFFICE 2,240,187

ENCLOSURE FOR ELECTRIC DEVICES

Ralph H. Kingdon and George K. Moore, Detroit, Mich., assignors to Square D Company, Detroit, Mich., a corporation of Michigan Application November 24, 1939, Serial No. 305,868

8 Claims. (Cl. 220—27)

This invention relates to the provision of readily removable means for optionally providing a plurality of different size openings in the walls of a sheet metal enclosing box for an electrical instrumentality to optionally closely receive conduits of different sizes which are attached to the box wall and carry therein circuit wires adapted for connection to the instrumentality within the box and has for its object the provision of such means wherein a plurality of sections are provided in the box wall which are integral therewith but scored so as to be readily removable therefrom, the sections when removed, providing substantially circular openings at least certain of which are non-concentric and substantially tangent at one point.

A further object of the invention is the provision of opening providing means within the wall of a sheet metal enclosing box for an electrical instrumentality which shall closely receive conduits of various sizes and in which the conduits, regardless of size, each have a surface disposed in substantially the same relation to the back of the box, and in which the smaller openings in a large opening providing means may still properly align with smaller opening providing means in shallow box walls.

Other objects and features of this invention will be readily apparent to those skilled in the art from the specification and appended drawings illustrating certain preferred embodiments in which:

Figure 1 is an elevational view of portions cut away of the enclosing box having opening providing means therein, with the smallest section removed to receive a conduit of the smallest size.

Figure 2 is an enlarged sectional view on the lines II—II of Figure 1.

Figure 3 is a sectional view on the lines III—III of Figure 2.

Figure 4 is a detail sectional view on the lines IV—IV of Figure 3.

Figure 5 is a perspective view of one of the opening providing means.

Figure 6 is a sectional view of the punch and die tool which forms the opening providing means shown in the preceding figures.

Figure 7 is a sectional view on the lines VII—VII of Figure 6.

Figure 8 is a view similar to Figure 6, with certain parts broken away and with the punch shown in retracted or open position.

Figure 9 is an enlarged detail sectional view on the lines IX—IX of Figure 8.

Figure 10 is an enlarged detail sectional view on the lines X—X of Figure 8.

Figure 11 is an enlarged detail sectional view on the lines XI—XI of Figure 10.

In the drawings, in which like reference numerals indicate like parts, there is shown a sheet metal enclosing box 1 for an electric circuit instrumentality generally indicated at 2. In the wall of the box, there is shown opening providing means indicated generally at 3 and composed of a plurality of sections integral with the box wall, but scored to be readily removable therefrom to provide the desired size opening. These sections include the inner disc section 4 removable to receive the smallest size conduit and scored about its entire outline, except for the tying portion 5 which holds the section in place until the tie is forcibly broken by bending or other manipulation when an opening is desired. Outside of the section 4, there is a larger ring section 6, which is scored about its exterior outline except at the top and bottom tie points 7 and 8. Beyond the section 6, there is a crescent shaped section 9 provided with a full tie at 10 and partial ties at 11 and 12, the ties 11 and 12 being slightly nicked in the forming operation to make these ties more frangible than the other ties provided. The largest opening in the wall is provided by the exterior boundary of the crescent shaped section 13 similarly scored throughout its outline, except at ties 14 and 15. The lower portion of ring section 6 follows the outline of section 13 to the ties 11 and 12 so that the crescent shaped section has ends of substantial width. Figures 1 to 4 inclusive show the smallest section 4 removed and a conduit 16 inserted through the opening in the box wall provided by the removal of the sections and maintained in place by interior and exterior locking nuts 18 and 17.

With the opening providing means thus described, it is seen that there are provided a plurality of sections which, when removed, leave substantially circular openings within the box wall for the reception of conduit. These sections are all scored to be readily removable but are provided with small tying portions at points on their exterior outlines which securely maintain sections which it is not desired to remove in place, while still being readily frangible by bending or other manipulations when the section is desired to be removed. It is seen that certain of the exterior outlines of the sections are non-concentric and are substantially tangent at the point nearest the back wall of the box. The sections 6, 9, and 13 have outlines which, if extended, would clearly be tangent at this point. Section 4, however, does not have its outline thus tangent to the others in view of the small width of section 6 which would cause the elements of the tie to be too thin for practical working operation if the section 4 were brought down into absolute tangency. However, the very fact which causes the small width of section 6 also renders this discrepancy in section 4 relatively immaterial, since the deviation is well within allowable tolerances. Furthermore, from the standpoint of the alignment of the small openings with concentric openings in smaller opening providing means in shallow boxes, sections 4 and 6 conform quite closely to the placing of such other opening providing means so that the conduit of the smaller size extending between small boxes of different form opening providing means will align to facilitate the connection.

The tools for forming the non-concentric section outlines in a single scoring operation are illustrated in Figures 6 to 11 inclusive. This tool comprises cooperating punch and die elements indicated generally at 21, 22. These elements are mounted within a press in a well-known manner and the reciprocation of the punch element produces the working operation upon the sheet metal forming the box enclosure. In the description of the elements of the punch parts referred to as relatively stationary and relatively movable, this does not refer to the normal movement of the punch as a unit in the press, but to the relative movement or non-movement of sections of the punch with respect to punch element itself. The punch or upper portion of the forming tool comprises a punch holder 23 having a plurality of movable stripper screws 24 therethrough which are threaded at their lower ends into a movable stripper plate 25. A recess 26 is provided within the bottom face of the punch holder in which is disposed a movable knockout plate 27 having secured thereto and depending therefrom movable knockout pins 28 and having secured at a central portion and extending upwardly therefrom the main punch stripper pin 29. Against the under surface of the punch holder 23 are rigidly secured the stationary punch sections 31 and 32 which have the depending portions 33 and 34 which cooperate with the die element to be hereinafter described to form the sections 6 and 13. Between the portions 33 and 34 is disposed a movable punch section called the upper knockout bushing 35 having an upper flange portion 36 disposed in a clearance opening 37 between the punch sections 31 and 32. Knockout pins 38 slidably extend through the punch section 31 into engagement with the flange 36 and are engaged at the upper ends by the knockout plate 27 to effect movement of the knockout bushing 35. Within the punch section 33 is the movable knockout punch 39 extending entirely through the punch section 31 and engaged at its upper end by the knockout plate 27 to be moved thereby.

The die element 22 of the tool comprises the die bushing 41 having mounted thereupon the exterior die section 42. Within the die section and a recess in the upper face of the die bushing are disposed stationary interior die sections 43 and 44 with the sections 44 having an upstanding central portion 45 corresponding to the knockout punch 39 and with the section 43 having an upstanding portion 46 corresponding to the upper knockout bushing 35. Between the portions 45 and 46 is disposed the lower knockout bushing 47 corresponding in contour to the depending portion 33 of the punch section 31 and having a flanged lower end 48 disposed in a clearance opening 49 in the section 43 so as to be relatively movable with respect thereto. Stripper pins 51 are provided having their upper ends bearing against the flange portion 48 and their lower ends secured in an exterior stripper plate 50. At the outside of the portion 46 is a second lower knockout bushing 52 corresponding in contour to the depending portion 34 on the punch section 32 and having a lower flange portion 53 disposed in the clearance opening 54 in the exterior die section 42 so as to be movable with relation thereto and having its flange portion 53 engaged by the die stripper pins 55 also secured in the die stripper plate 50. An opening is provided in the stripper plate 50 through which extends a rod 56 threaded into the die bushing 41 and carrying a spring 57 bearing against the lower surface of the plate 52 for effecting movement thereof and of the lower knockout bushings when the punch is moved upwardly. Keys 58 and 59 are provided for preventing rotation of the punch and die parts.

From Figure 9 it is seen that depending portion 34 which forms the section 13 is so formed as to leave an opening in the punch parts corresponding to the ties at 11 and 12; however, the die section, in order to properly form and nick these parts, has its knockout bushing 52 formed similarly to the upper punch section and, in addition, is provided with fill-in parts for the discontinuous portion in the form of key shaped elements 61, disposed in the die section 42 and provided with lugs 62 in which are threaded studs 63 to secure them in place.

In the central sectional view taken for Figures 6 and 8, the portions of the punch and die which form the ties 14 and 15 are shown. These include clearance notches provided in the edge of the die section 42, as at 64. Immediately above these clearance notches, the lower edge of the depending portion of the punch section 34 is similarly provided with notches 65, the notches cooperating to leave the unscored tie portions. The tie-forming notch portions in the die parts are also shown in the plan portion of Figure 10 where they have been numbered 64, the partial tie at 11 and 12 being formed by the coaction between the elements 61 and the clearance portions in the punch.

The operation of the tool for forming the opening providing means will be apparent from the previous description. The sheet metal is inserted between the punch and die when the punch is in the open position shown in Figure 8, whereupon the press is operated to depress the punch into the position shown in Figure 6. In this operation, the movable elements of the punch embodying the stripper plate 25 and the upper knockout bushing 35 and knockout punch 39 will be moved upwardly with respect to the relative stationary parts of the punch as they encounter portions of sheet metal backed up by the stationary die sections, and, similarly, the lower knockout bushings will move downwardly out of the plane of the plate by the stationary punch sections. In this operation, the sections 13 and 6 will be moved away from the normal plane of the sheet metal plate from which they are formed, their outlines, except for the ties, being entirely cut away from the main body of the plate in the desired manner.

As the punch is retracted from the position of Figure 6, the lower knockout bushings 47 and 52 will move upwardly under the bias of spring 57 to strip the sheet metal plate from the die section. The sheet metal work plate will ordinarily move upwardly with the punch section until the punch stripper pin 29 is engaged by a stationary part on the press in well known manner, whereupon the knockout plate 27 is depressed to effect movement of the stripper plate 25, upper knockout bushing 35 and knockout punch 39 to strip the work plate from the punch for removal.

When removed from the die, the opening providing means will retain substantially the relation shown in Figure 6 and ordinarily a further pressing operation between flat die plates is provided in which the pressed out sections are pressed partially back toward their original position. This is indicated from a comparison of Figure 6 wherein the sections are entirely removed from the plane of the original plate to Figure 2 in which the sections have been pressed the majority of the distance back into position. This provides a neater and smoother arrangement while maintaining the scoring or shirring of the sections which provides for their ready removal.

While certain preferred embodiments of this invention have been specifically disclosed, it is understood that the invention is not limited thereto, as many variations will be readily apparent to those skilled in the art and the invention is to be given its broadest possible interpretation within the terms of the following claims.

What is claimed is:

1. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at spaced, integral tie points so as to be readily removable therefrom to provide the desired size opening and having substantially circular outer outlines defined by the shear lines or the projection thereof, at least certain of said outlines being substantially tangent at the point nearest the back of the box whereby conduit of various sizes will have their exterior surfaces at substantially the same distance from the back of the box, the outer shear lines of certain of said sections terminating a substantial distance short of the point of tangency and utilizing another shear line passing therethrough to complete the opening provided by removal of the section.

2. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at spaced, integral tie points so as to be readily removable therefrom to provide the desired size opening, said sections including: a disc-shaped section whose removal provides the smallest size opening, a substantially ring-shaped section concentric with the disc providing the next larger opening and at least one crescent-shaped section having its projected outer shear line tangent to the outer shear line of the ring at the point nearest the back of the box, the outer shear line of the ring-shaped section adjacent to the point of tangency following the projected outer shear line of the crescent-shaped section for an appreciable distance whereby the ends of the crescent-shaped section are formed by a substantial body of material.

3. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at spaced, integral tie points so as to be readily removable therefrom to provide the desired size opening and having substantially circular outer outlines defined by the shear lines or the projection thereof, at least certain of which are substantially tangent at the point nearest the back of the box, the outer shear line of an interior section adjacent to the point of tangency following the projected outer shear line of an outer section tangent thereto, whereby the outer section terminates at points removed from the point of tangency with its ends formed by a substantial body of material.

4. In sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at spaced, integral tie points so as to be readily removable therefrom to provide the desired size opening and having substantially circular outer outlines defined by the shear lines or the projection thereof, at least certain of which are substantially tangent at the point nearest the back of the box, the outer shear line of an interior section adjacent to the point of tangency following the projected outer shear line of an outer section tangent thereto, whereby the outer section is crescent-shaped with its ends formed by a substantial body of material, and an intermediate crescent-shaped section between said interior and outer sections having its projected outer shear line tangent at said point and having its ends adjacent to the ends of the outer crescent-shaped section, and metal tie portions integral with the ends of said intermediate section and with the main wall of the box and lying between the ends of the outer section and said interior section.

5. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at integral tie points so as to be readily removable therefrom to provide the desired size opening and having substantially circular outer outlines defined by the sheared lines or the projection thereof, at least certain of which are substantially tangent at the point nearest the back of the box, the outer shear line of an interior section adjacent to the point of tangency following the projected outer shear line of an outer section tangent thereto, whereby the outer section is crescent-shaped with its ends formed by a substantial body of material, and an intermediate crescent-shaped section between said interior and outer sections having its ends adjacent to the ends of the outer crescent-shaped section, metal tie portions integral with the ends of said intermediate section and with the main wall of the box and lying between the ends of the outer section and said interior section, and nicks in said tie portions on the line of the projected outer shear line of the outer section to insure their breaking from the box wall on said line when the intermediate section is removed.

6. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at integral tie points so as to be readily removable therefrom to provide the desired size opening and having substantially circular outer outlines defined by the shear line, at least certain of said outlines being substantially tangent at the point nearest the back of the box, the two outermost sections being substantially crescent-shaped and the two innermost sections being substantially disc and ring-shaped respectively, means of unsheared metal tying the disc section to the ring section, means of unsheared metal tying the ring section to the main box wall and to the inner crescent-shaped section, means of unsheared metal tying the inner crescent-shaped section to the main box wall and to the outer crescent-shaped section and means of unsheared metal tying the outer section to the main box wall.

7. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at integral tie points so as to be readily removable therefrom to provide the desired size opening and having substantially circular outer outlines defined by the shear lines, at least certain of said outlines being substantially tangent at the point nearest the back of the box, said sections including two outer crescent shaped sections whose projected outer shear lines are tangent, means of unsheared metal tying said sections to adjacent sections and to the box wall, the inner crescent-shaped section being tied to the main box wall by unsheared metal portions integral with its ends, the outer crescent-shaped section having its ends disposed adjacent to the end ties for the inner crescent-shaped section.

8. In a sheet metal enclosing box for an electrical instrumentality, opening providing means for the attachment of conduit and the entrance of conductors carried therein for attachment to said instrumentality, said means being located at least in a side or end wall of the box and optionally providing a plurality of different size openings for the reception of different size conduit, said means comprising a plurality of sections originally integral with said box wall but substantially sheared therefrom except at integral tie points so as to be readily removable therefrom to provide the desired size opening and having substantially circular outer outlines defined by the shear lines, at least certain of said outlines being substantially tangent at the point nearest the back of the box, said sections including two outer crescent-shaped sections whose projected outer shear lines are tangent, means of unsheared metal tying said sections to adjacent sections and to the box wall, the inner crescent-shaped section being tied to the main box wall by unsheared metal portions integral with its ends, the outer crescent-shaped section having its ends disposed adjacent to the end ties for the inner crescent-shaped section, and nicks in the end ties of the inner crescent shaped section along the line of the projected outer shear line of the outer crescent-shaped section to insure breakage of the ties from the box wall on said line when the inner crescent-shaped section is removed.

RALPH H. KINGDON.
GEORGE K. MOORE.